(12) United States Patent
Lippincott et al.

(10) Patent No.: US 8,094,723 B2
(45) Date of Patent: Jan. 10, 2012

(54) MOTION ESTIMATION SUM OF ALL DIFFERENCES (SAD) ARRAY HAVING REDUCED SEMICONDUCTOR DIE AREA CONSUMPTION

(75) Inventors: Louis Lippincott, Los Altos, CA (US); Kalpesh Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1563 days.

(21) Appl. No.: 10/750,075

(22) Filed: Dec. 31, 2003

(65) Prior Publication Data
US 2005/0147168 A1    Jul. 7, 2005

(51) Int. Cl.
*H04N 7/12* (2006.01)
*H04N 11/02* (2006.01)
*H04N 11/04* (2006.01)

(52) U.S. Cl. .......... 375/240.16; 375/240.01; 375/240.12

(58) Field of Classification Search ............. 375/240.16, 375/240.12
See application file for complete search history.

(56) References Cited

U.S. PATENT DOCUMENTS

| | | | | |
|---|---|---|---|---|
| 5,506,747 A * | 4/1996 | Bain | ....................... | 365/230.03 |
| 6,421,466 B1 * | 7/2002 | Lin | ............................... | 382/236 |
| 6,888,943 B1 * | 5/2005 | Lam et al. | ...................... | 380/268 |
| 2004/0098548 A1 * | 5/2004 | Hansen et al. | ................. | 711/165 |
| 2004/0120197 A1 * | 6/2004 | Kondo et al. | ................. | 365/202 |

FOREIGN PATENT DOCUMENTS
WO    WO 03/024117    3/2003

OTHER PUBLICATIONS

Pourrezoc et al, "Weighted Multiple Bit-Plane Matching, A Simple and Efficient Matching Criterion for Electronic Digital Image Stabilizer Application," Signal Prcoessing, 2002 6th International Conference on Aug. 26-30, 2002, Piscataway, NJ, USA, IEEE, vol. 2, Aug. 26, 2002, pp. 957-960, XP010627688, ISBN: 0-7803-7488-6.*
PCT International Search Report, PCT/US2004/043669, Intel Corporation, May 10, 2005, 8 pages.
Moshnyaga, Vasily G., "An MSB Truncation Scheme for Low-Power Video Processors," Circuits and Systems, 1999. ISCAS '99. Proceedings of the 1999 IEEE International Symposium in Orlando, FL, USA, May 30-Jun. 2, 1999, IPiscataway, NJ, USA, IEEE, U.S. vol. 4, May 30, 1999, pp. 291-294, XP010341168, ISBN: 0-7803-5471-0.
He, Zhong-Li, et al., "Low Power Motion Estimation Design Using Adaptive Pixel Truncation," Proceedings of the 1997 International Symposium on Low Power Electronics and Design, Aug. 18, 1997, pp. 167-172, XP002325680, California, USA.

(Continued)

*Primary Examiner* — Christopher S Kelley
*Assistant Examiner* — Chikaodili E Anyikire
(74) *Attorney, Agent, or Firm* — Trop, Pruner & Hu, P.C.

(57) ABSTRACT

An apparatus is described comprising: logic circuitry to take an absolute difference between: 1) less than all of the bits of an uncompressed video data value from a reference macro block and 2) less than all of the bits of an uncompressed video data value from a macro block worth of data within a search window. The apparatus further includes a register to store the reference macro block. The register is coupled to the logic circuitry. The apparatus further include a random access memory to store the search window. The random access memory is coupled to the logic circuitry.

18 Claims, 6 Drawing Sheets

OTHER PUBLICATIONS

Su, C.-L., et al., "Motion Estimation Using MSD-First Processing," IEE Proceedings: Circuits Devices and Systems, Institution of Electrical Engineers, Stenvenage, GB, vol. 150, No. 2, Apr. 7, 2003, pp. 124-133, XP006020012, ISSN: 1350-2409.

Wujian, Zhang, et al., "A High-Throughput Systolic Array for Motion Estimation Using Adaptive Bit Resolution," ASIC, 2001. Proceedings. 4th International Conference on Oct. 23-25, 2001, Piscataway, NJ, USA, IEEE, Oct. 23, 2001, pp. 378-381, XP010576789, ISBN: 0-7803-6677-8.

Pourreza, H.R., et al., "Weighted Multiple Bit-Plane Matching, A Simple and Efficient Matching Criterion for Electronic Digital Image Stabilizer Application," Signal Processing, 2002 6th International Conference on Aug. 26-30, 2002, Piscataway, NJ, USA, IEEE, vol. 2, Aug. 26, 2002, pp. 9576-960, XP010627688, ISBN: 0-7803-7488-6.

Chinese Patent Office, First Office Action for Chinese Application No. 200480036154.0, 25 pages, Jul. 25, 2008.

Weighted multiple bit-plane matching, a simple and efficient matching eriterion, for electronic digital image stabilizer application, H.R. Pourreza, M. Rahmati, F. Behazin, ISCP 02 Proceeding, p. 957-960, Dec. 31, 2002.

\* cited by examiner

MOTION ESTIMATION SUM OF ALL DIFFERENCES (SAD) ARRAY HAVING REDUCED SEMICONDUCTOR DIE AREA CONSUMPTION

FIELD OF INVENTION

The field of invention relates to motion estimation; and, more specifically, to a motion estimation Sum of All Differences (SAD) logic circuit having reduced semiconductor die area consumption.

BACKGROUND

Digital video is typically embodied as a collection of digital still frames that convey motion when displayed in succession. Because visual information (such as digital video) naturally consumes large amounts of data, data compression is often applied to reduce the amount of data without substantially degrading the original imagery. Motion estimation is a compression technique that is most often applied to digital video.

According to the motion estimation approach, a first frame is broken down into small pieces (referred to as "macro blocks"); then, each macro block is searched for in a data field (referred to as a "search window") of a second frame that follows or precedes the first frame (in the sequence of frames that the video information is comprised of). The macro block being searched for may be referred to as a "reference macro block" or a "reference block". For each found reference macro block (ideally all reference macro blocks are found in the second frame), a displacement vector is recorded that describes the movement of the reference macro block. Thus, compression is achieved by preserving displacement vectors instead of actual visual content.

Figure 1:
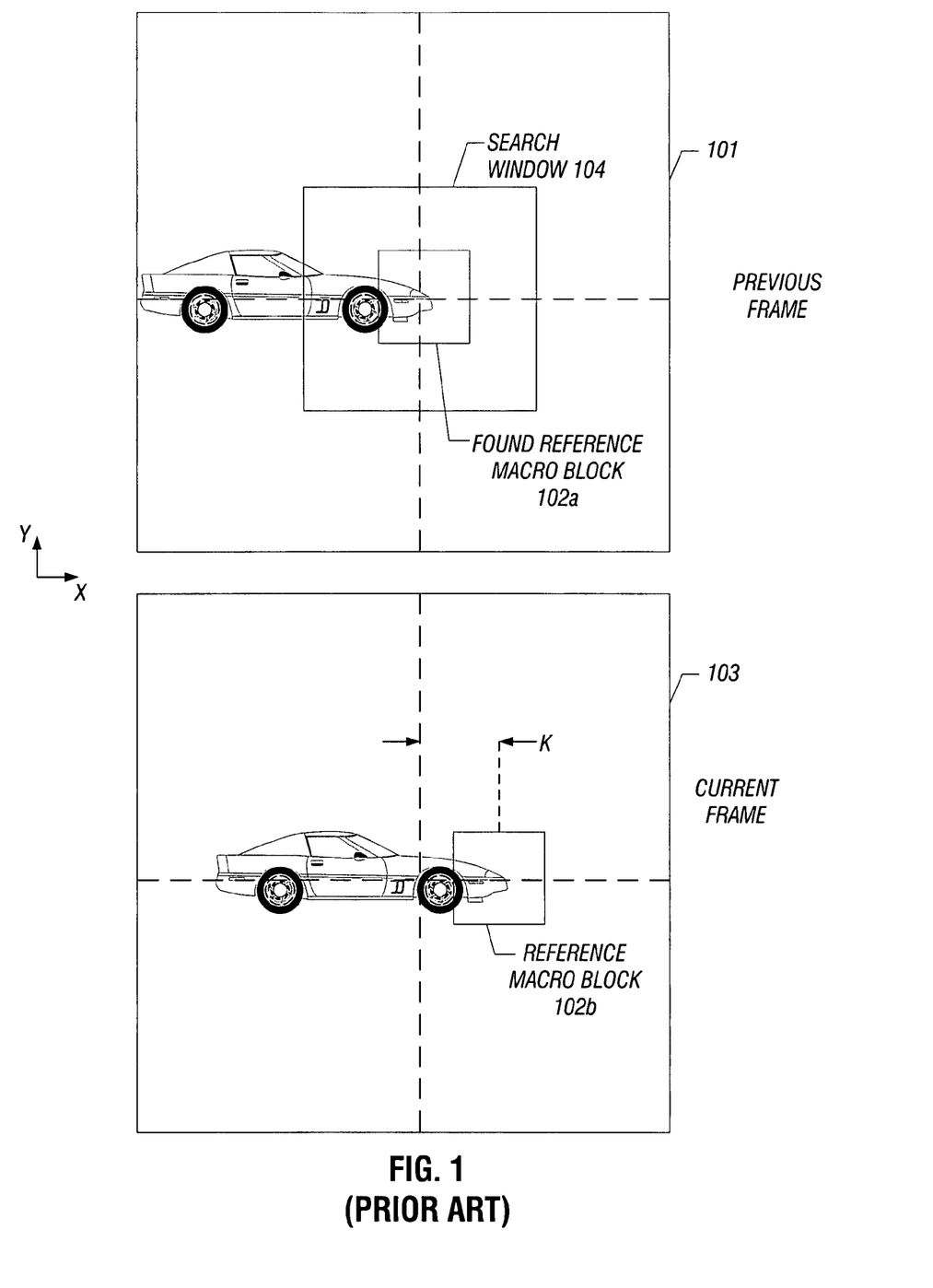
FIG. 1 shows an exemplary depiction of two digital video frames.

FIG. 1 demonstrates a simple example of motion estimation for a digital video that depicts an automobile moving from left to right. A "current" frame 103 corresponds to the first frame referred to above. The current frame 103 follows a "previous" frame 101 in the sequence of frames that convey movement of the automobile from left to right in FIG. 1. The previous frame 101 corresponds to the second frame referred to just above. A reference macro block 102b that captures the nose of the automobile is depicted in the current frame 103 and a search window 104 is depicted in the previous frame 101.

It is important to point out that other scenarios are possible as between which frame is the "first" frame having the reference block and which frame is the "second" frame having the search window. For example, alternatively, the second frame may be a subsequent frame relative to the first frame (rather than a previous frame as described just above with respect to FIG. 1).

Note that other reference macro blocks would be defined in current frame 103. Notably, the sequence of the previous and current frames 101, 103 portray the automobile moving a distance K to the right. According to basic motion estimation, a field of data 104 larger than a macro block is taken from the previous frame 101 and used as a search window for finding the reference macro block 102b of the current frame 103. The search window 104 may be centered around the center position of the current frame's reference macro block 102b (i.e., the search window 104 is centered at a horizontal offset of K from the frame origin in the example of FIG. 1). An aptly size search window 104 should always result in the finding of the reference macro block 102b (if the object undergoing movement does not change its own features). According to the example of FIG. 1, the reference macro block 102b of the current frame 103 is discovered in the search window 104 a distance K to the left of its original position within the current frame 101. As such, a displacement vector of (K,0) is recorded for macro block 102a (i.e., $((x_c-x_p),(y_c-y_p))=((K-0),(0-0))=(K,0)$; where, "c" denotes "current" and "p" denotes previous).

FIGURES

The present invention is illustrated by way of example, and not limitation, in the figures of the accompanying drawings in which like references indicate similar elements and in which:

FIG. 5b relates to the different resolutions between a SAD calculation process that processes all bits per data value and a SAD calculation process that can be performed with the circuitry depicted in FIG. 5a;

DETAILED DESCRIPTION

Figure 2:
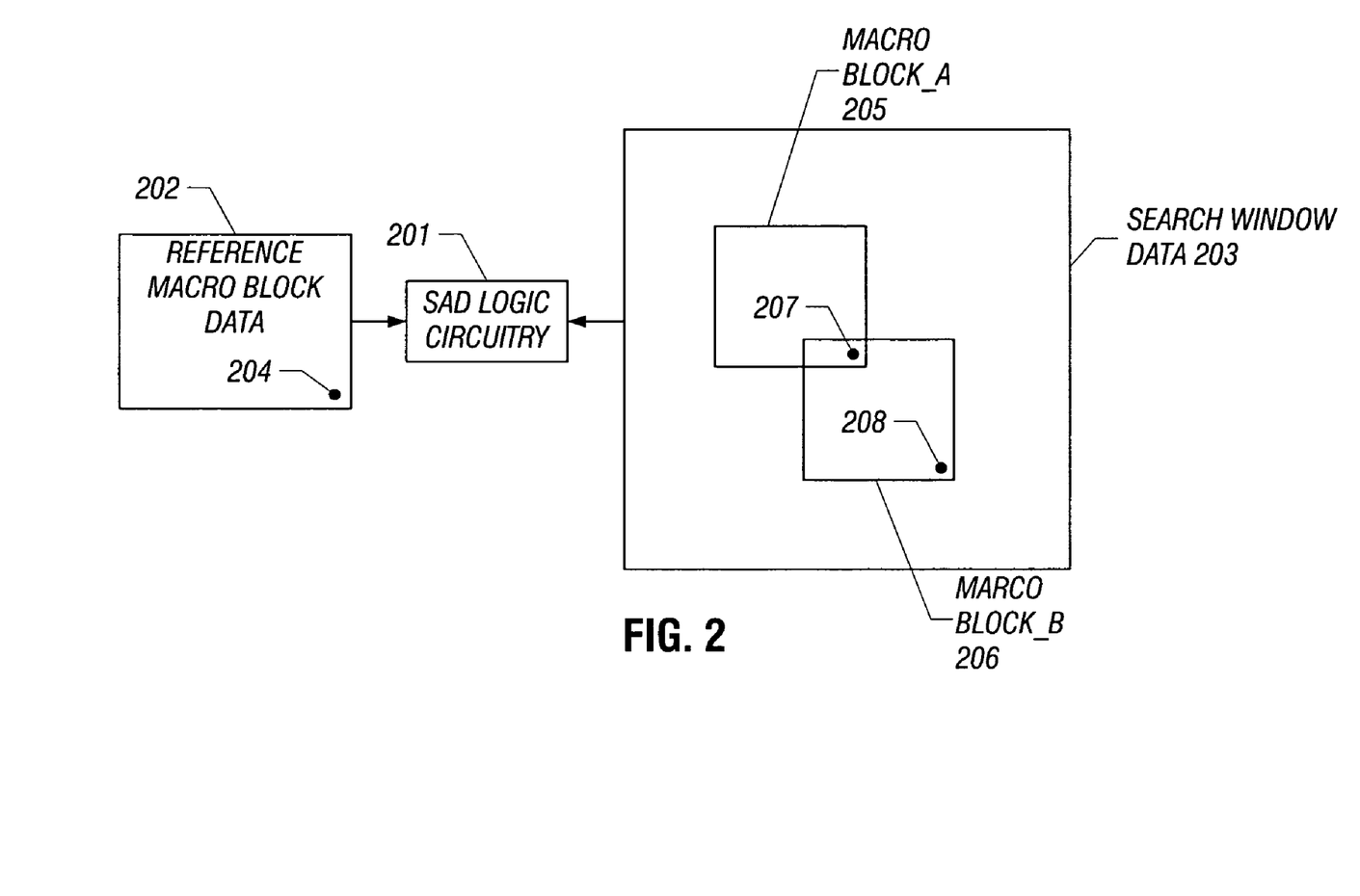
FIG. 2 shows an exemplary depiction of SAD logic circuitry and its corresponding macro block data and search window data.

In order to "find" a macro block in a search window, a Sum of Absolute Differences (SAD) approach is often used. FIG. 2 shows a depiction of a basic architecture. According to the basic architecture of FIG. 2, SAD logic circuitry 201 calculates the absolute value of the difference (i.e., hereinafter, "the absolute difference") between a data value (e.g., a pixel value) from the first frame's reference macro block data 202 and its corresponding data value (e.g., a corresponding pixel value) from the second frame's search window data 203. Here, use of the term corresponding means that data values chosen for calculating absolute difference terms are aligned with respect to their positioning within the first frame's reference macro block and a reference macro block worth of data within the search window data 203.

That is, basic operational flow involves calculating and summing over absolute differences for each pair of corresponding data values between the first frame's reference macro block data 202 and a specific macro block worth of data within the search window data 203. Once the sum of the absolute differences for the specific macro block worth of data is determined, the basic operational flow is repeated for a next specific macro block worth of data within the search window data 203. When a sum of absolute differences has been determined for all macro blocks worth of data that can be identified within the search window data 203, the macro block worth of data having the lowest sum of absolute differences is deemed the "found" macro block within the search window.

For example, FIG. 2 shows a "lower right corner" value 204 in the reference macro block data 202. For purposes of calculating an absolute difference, the lower right corner value 204 is always compared against its corresponding value (i.e., the lower right corner value) of each macro block worth of data that can be identified within the search window 203. For simplicity, FIG. 2 only shows two macro blocks worth of data 205, 206 (amongst the many) that can be identified within the search window 203. Calculation of the SAD for macro block 205 will therefore include calculating the absolute difference of the corresponding lower right corner values 204 and 207. Likewise, calculation of the SAD for macro block 206 will include calculating the absolute difference of the corresponding lower right corner values 204 and 208. All corresponding values between the reference macro block and the search window macro blocks are similarly dealt with.

The depiction of FIG. 2 and its corresponding discussion above related to the processing involved for only a single reference macro block. Here, it is important to recall that the first frame is broken down into a plurality of many reference macro blocks. As such, the processing referred to above with respect to FIG. 2 is performed many times over for each reference macro block within the first frame so that compression can be achieved for the area of an entire frame. In order to achieve high performance (e.g., reduced processing times) an array of Absolute Difference (AD) units is used to simultaneously calculate AD terms for a plurality of corresponding data value (e.g., pixel) pairs as between a reference macro block and a macro block worth of data from a search window.

Figure 3:
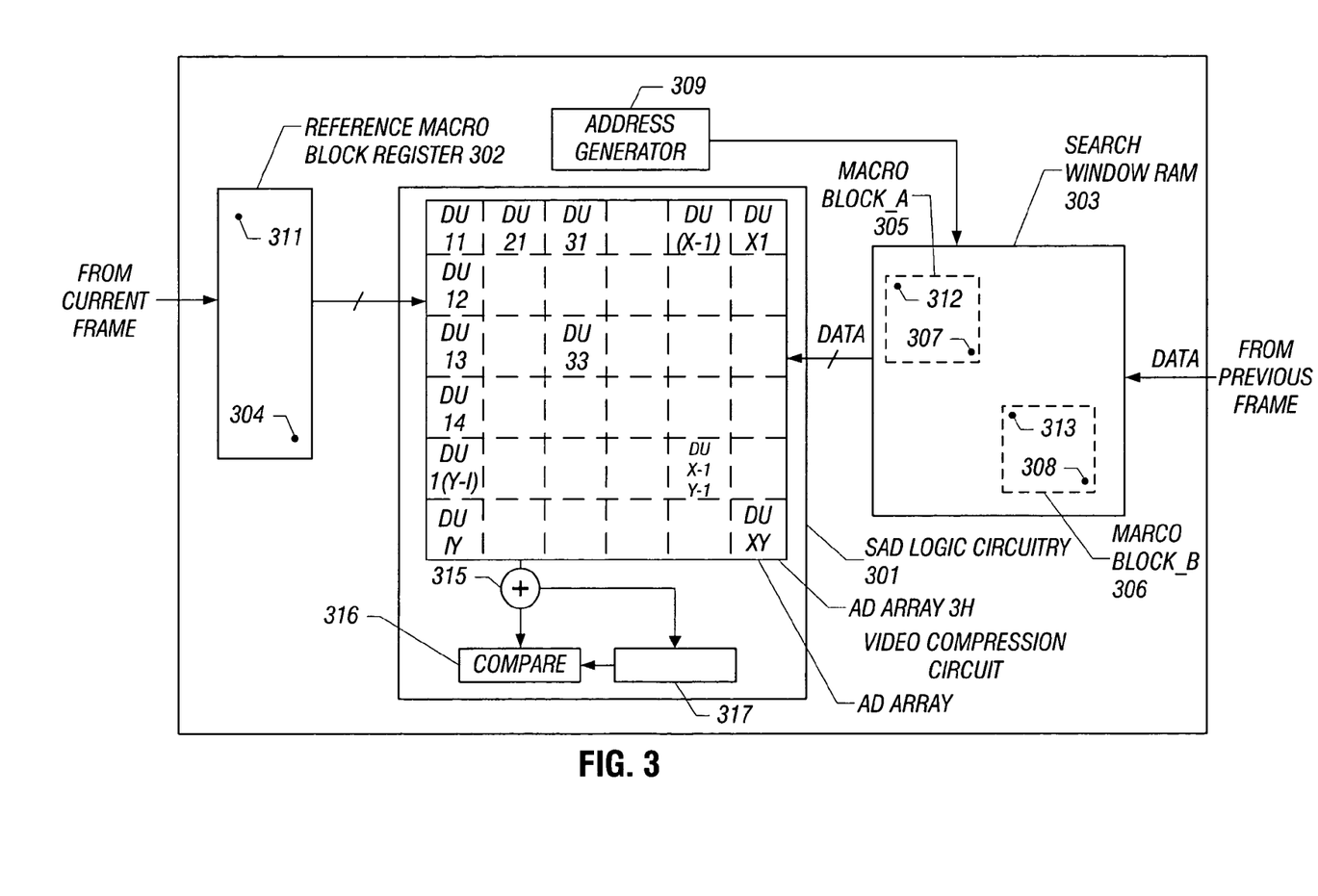
FIG. 3 shows an exemplary depiction of an AD unit array coupled to receive a previous frame's data and current frame's data.

FIG. 3 explores the concept in more detail. FIG. 3 shows SAD logic circuitry 301 comprised of an array 314 of AD units 11 through XY each geared to calculate the absolute difference between data from a corresponding location within the reference macro block and a macro block worth of data within a search window. For example, for macro block A 305, AD unit 33 is designed to calculate the absolute difference between: 1) a data value 311 that is held within a register 302 that stores the reference macro block's data; and, 2) a corresponding data value 312 to data value 311 within macro block A 305 which, in turn, resides within a search window's worth of data that is held within a random access memory (RAM) 303.

For the same macro block A 305, SAD unit (X-1)(Y-1) is designed to calculate the absolute difference between: 1) a data value 304 that is held within a register 302; and 2) a corresponding data value 307 to data value 304 within macro block A 305. Likewise, for macro block B 306, AD unit 33 is designed to calculate the absolute difference between data value 311 and data value 313; and, AD unit (X-1)(Y-1) is designed to calculate the absolute difference between data value 304 and data value 308.

The absolute differences for all the data values are added to together by an adder 315 to form a SAD value for the particular macro block within the search window being analyzed (e.g., macro block_A or macro block_B). The computed SAD value is then compared by comparator 316 against the lowest SAD value obtained so far within the search window (which is stored in register 317). When the search window has been completely analyzed, the macro block within the search window having the lowest SAD value is recognized as the "found" reference block within the search window. A motion vector is then calculated. With each new reference macro block loaded into register 302, a new field of search window data is loaded into RAM 303.

A problem, however, is that large arrays of AD units consume large amounts of semiconductor die area and electrical power.

In order to address the power and semiconductor die area consumption issues, it is helpful to recognize that a SAD calculation acts to compare likeness between two fields of data (e.g., current frame's macro block and previous frame's search window macro blocks); while, the specific fields of data themselves contain data points that express different intensity values. As such, efficiency can be realized by recognizing that the number of bits needed per data value (e.g., per pixel) to allow a range of intensity values for images of sufficient contrast (e.g., typically 8 bits per pixel) is greater than the number of bits needed per data value to confirm or deny sameness between fields of data.

Simply put, the resolution of the data (in terms of the number of bits per data value) does not need to be as high for SAD calculations as it does for image rendering. An AD unit within an AD array can therefore be designed to process less than the full number of bits per data value than what is provided by the frames themselves; and, as a consequence, conserve power and semiconductor die consumption.

Figure 4A:
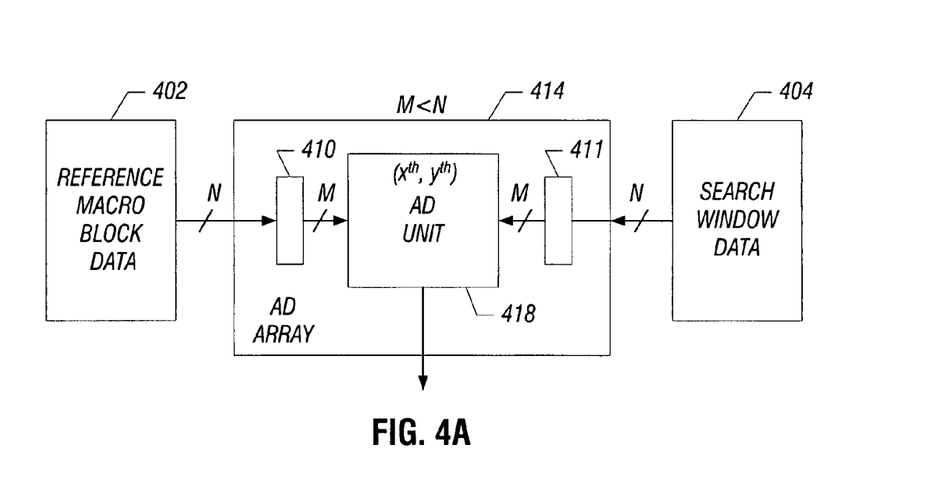
FIG. 4a shows an exemplary depiction of an AD unit having improved power and surface area consumption and its corresponding macro block data and search window data.

FIG. 4a shows an example. Note that FIG. 4a indicates that data values from the reference macro block 402 and the macro block being analyzed within the search window 209 naturally take the form of N bit wide data values (i.e., N bits per data value). Yet, the ($x^{th}$, $y^{th}$) AD unit 418 only processes M of the N bits per data value, where, M is less than N. By processing less than all of the bits per data value from the frame data, the AD unit 418 should be smaller in size and consume less power than an AD unit configured to process full width data values. Such efficiencies should extend to the array 414 as a whole because it is comprised of a plurality of efficient AD units.

FIG. 4a suggests that the reduction in bit width from N to M bits is accomplished by reading a full N wide data value from both the reference macro block 402 (e.g., from register 302 in FIG. 3) and the macro block within the search window 409 (e.g., from RAM 303 in FIG. 3); and, storing the N wide data values into respective register space 410, 411. Then, only the M bits used for SAD calculations are read from the respective register space 410, 411 by the AD unit 418. In other implementations, the loaded frame data itself may be properly reduced beforehand from N bits per value to M bits per value (e.g., prior to being loaded into register 302 and RAM 303, respectively); or, the loaded frame data may remain as N wide data values but the wiring is configured to ignore the unused N-M bits when the data is physically transferred toward the AD unit 418. Either of these basic architectures could be represented by removing register space 410 and 411 from FIG. 4a and connecting the reference block data 402 and the search window data 404 to the AD unit with an M wide bus (i.e., the N wide bus is removed).

With the understanding that efficiency is gained through SAD calculations involving less bits per data value than the image data itself, the question arises as to which bits should be ignored and which bits should be selected for purposes of performing SAD calculations. The following discussion outlines various approaches including: 1) ignoring only lowest ordered bits in succession; 2) ignoring the highest ordered bit and one or more successive lower ordered bits; and, 3) custom calculating which bits are to be ignored based upon the data itself. Each of these are discussed immediately below.

Ignoring Only the Lowest Ordered Bits in Succession

Figure 4B:
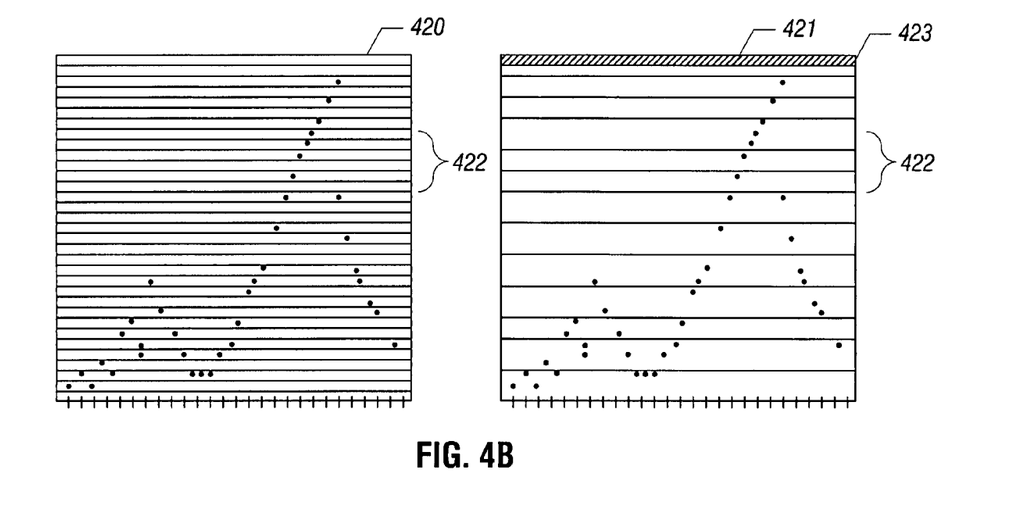
FIG. 4b relates to the different resolutions between a SAD calculation process that processes all bits per data value and an SAD calculation process that processes less than all bits per data value.

Ignoring the lowest order bits has the biggest impact on resolution but the smallest impact on dynamic range. FIG. 4b demonstrates this aspect in simple terms. Before discussing FIG. 4a, however, it is first helpful to go through the binary mathematics at play. Consider as an example frame data implemented as 8 bits per data value (i.e., N=8); and, consider an example of ignoring only the three lowest ordered bits in succession (i.e., M=5). In such a case, a mask of the original 8 bit value can be represented as _ _ _ _ _ XXX, where X is an ignored bit and _ is a non ignored bit. The full 8 bit data values are capable of expressing a dynamic range of 0 to 255 with a resolution of 1 (i.e., 256 different values: 0, 1, 2, 3, ..., 255). Ignoring the lowest ordered three bits of an 8 bit data value causes the richness of the expressible numeric values to be degraded to a dynamic range of 0 to 248 with a resolution of 8 (i.e., 31 different values: 0, 8, 16, 24, ..., 248).

FIG. 4b attempts to graphically depict the comparison outlined above (albeit qualitatively and not to scale). The leftmost depiction 420 provides a qualitative feel for the dynamic rage and resolution at which macro block data values can be expressed when all of the bits per data value from a video frame are employed (e.g., all 8 bits as discussed in the example above). The rightmost depiction 421 provides a qualitative feel for the dynamic rage and resolution at which the same macro block data values can be expressed when a set of successive lower ordered bits per data value from a video frame are dropped (e.g., the three lowest bits are dropped as discussed in the example above).

Here, note that the data profile observed in depictions 420, 421 of FIG. 4b can be viewed as a plot of macro block data values. For example, simply by reading macro block data values in some order (e.g., first row left to right, second row left to right, ... last row left to right) a pattern unique to the imagery of the macro block will reveal itself. The SAD circuitry essentially finds matching patterns as between the reference macro block pattern and the search window's macro block pattern. Because the space between a neighboring pair of horizontal lines corresponds to a same numeric value, higher resolution (i.e., smaller increments) is represented in the depictions of FIG. 4b as less space between neighboring lines; which, in turn, corresponds to more horizontal lines superimposed over the data.

Clearly the leftmost depiction 420 has higher resolution than the rightmost depiction 421. For example, referring to the set of data points 422, note that the data points are expressed with a different numeric value in the leftmost depiction 420 (because each data point is binned between a different pair of horizontal lines); while, for the rightmost depiction 421 these same data points must be expressed with the same data value (because they are each binned between the same pair of horizontal lines). The loss in dynamic range is depicted as a hashed region 423 where values cannot be expressed. Here, any value that under full resolution would fall in the blacklisted region 423 would be given a "clipped" maximum value at the highest space between neighboring lines.

With an understanding of the loss in dynamic range and resolution that occurs when lower ordered bits are dropped, depictions 420 and 421 help to emphasize the point that full resolution (e.g., as qualitatively observed in the leftmost depiction 420) is not necessary to identify matching patterns or at least patterns having a high degree of sameness. That is, for many practical situations, the resolution observed in depiction 421 is "good enough" to identify matching patterns. A pair of identical or nearly-identical macro block patterns as observed in depiction 421 (and expressed with the resolution and dynamic range observed in depiction 421) should correctly produce a very small SAD value (so as to mark sameness or near sameness between the pair of patterns) because the unique features of the entire pattern as a whole is weighed into the SAD calculation (e.g., the smaller left peak, the large right peak, etc.).

Ignoring the Highest Ordered Bit and One or More Successive Lower Ordered Bits

Ignoring the highest ordered bit has a significant impact on dynamic range but allows for better resolution. As an example, consider again frame data implemented as 8 bits per data value (i.e., N=8) where 3 three bits are to be ignored (i.e., M=5) including the highest ordered bit and the two lowest ordered bits (i.e., a mask of the original 8 bit value can be represented as X_ _ _ _ _ XX, where X is an ignored bit and _ is a non ignored bit). According to the numerics of such an approach, the dynamic range is more than cut in half on a linear scale; but, the resolution is better than that observed in depiction 421 of FIG. 4b. Specifically, whereas the full 8 bit data values are capable of expressing a dynamic range of 0 to 255 with a resolution of 1 (i.e., 256 different values: 0, 1, 2, 3, ..., 255), the "X_ _ _ _ _ XX" approach is only capable of expressing a dynamic range of 0 to 124 with a resolution of 4 (i.e., 31 different values: 0, 4, 8, 12, ..., 124).

Figure 5A:
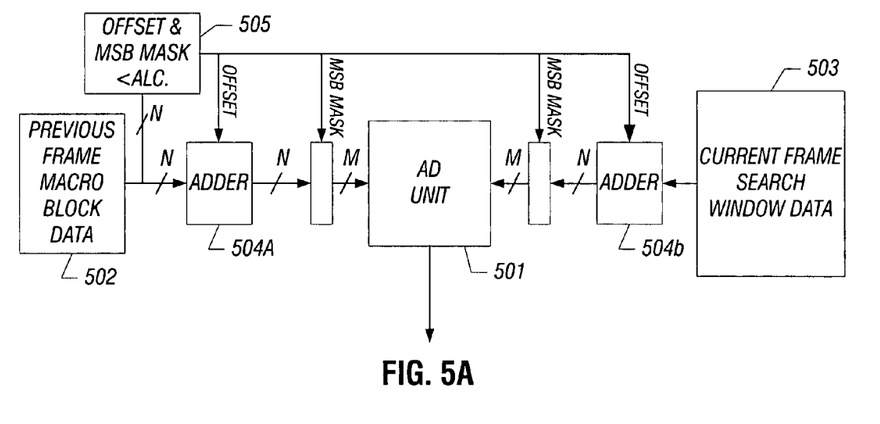
FIG. 5a shows an exemplary depiction of another AD unit embodiment having improved power and semiconductor die area consumption and its corresponding macro block data and search window data.
Figure 5B:
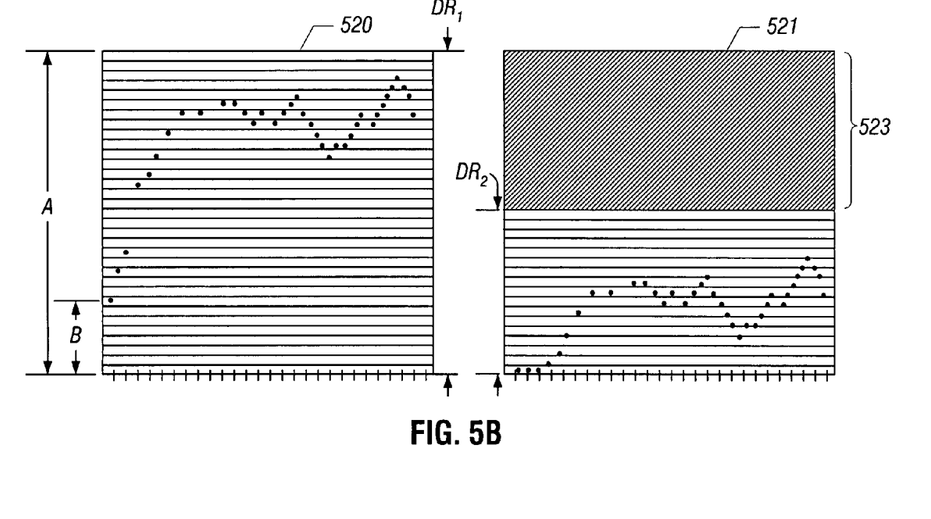

Comparing the rightmost depiction 521 of FIG. 5b with the rightmost depiction 421 of FIG. 4b, note that the hashed region 423, 523 that corresponds to dynamic range loss is much larger in FIG. 5b than in FIG. 4b; however, the resolution as measured by the space between neighboring lines is improved. The approach represented in FIG. 5b is an ideal approach when the macro block data is as observed in FIGS. 5a and 5b: for the most part, "stuffed" in a particular half or so of the full dynamic range. In such a situation, because the data is "stuffed" in a particular half or so of the full dynamic range, a substantial loss in dynamic range is acceptable because the data for the most part does not exist in half of the full dynamic range space. Moreover, again because the data is stuffed into a particular region, it is helpful to improve the resolution as compared to the approach of FIG. 4b so that the data values can be better differentiated and the overall data profile better captured as a consequence.

In order to treat data that is for the most part stuffed into a higher half of the full dynamic range (as observed in FIGS. 5a and 5b) or a middle half of the full dynamic range, an offset should be added to the data to make it viewable within the limited dynamic range. FIG. 5a presents a basic circuit architecture; and, depiction 520 of FIG. 5b shows a data pattern that is stuffed into an upper half of the full dynamic range.

According to one embodiment of that the architecture of FIG. 5a can be applied to, an offset calculation unit 505 (which can be constructed with logic circuitry) detects that the first frame's macro block data 502 manifests a pattern having data values that are stuffed into an upper half of the full dynamic range; and, in response, provides an offset of—(A-B) to effectively "drop" the data values into the viewable dynamic range as depicted in FIG. 5b (note in FIG. 5b that negative values after application of the offset are clipped to a value of 0). A pair of adders 504a, 504b add raw frame data values to the offset. In the embodiment of FIG. 5a the additions are performed with N bit wide data values. The AD unit 501 (which may also be implemented with logic circuitry) then operates on M of these N bits per data value by ignoring the highest ordered bit and one or more successive lower ordered bits.

Custom Calculating which Bits are to be Ignored Based Upon the Data Itself

In another (more sophisticated) embodiment to which the architecture of FIG. 5a can be applied, the offset calculation unit 505 is designed to not only determine an offset to be applied to the raw data but also determine which bits of the N bits per raw data value are to be masked out so that only M bits per data value are used for SAD calculation purposes. Here, a least significant bit is masked out for each of the N-M most significant bits that cannot be masked out. For example, if M=8 and N=5, then there exist four possible scenarios: 1) none of the most significant bits are masked out leaving the three least significant bits to be masked out; 2) the most significant bit is masked and the two least significant bits are masked out; 3) the two most significant bits are masked and the least significant bit is masked out; and, 4) the three most significant bits are masked out.

Figure 5C:
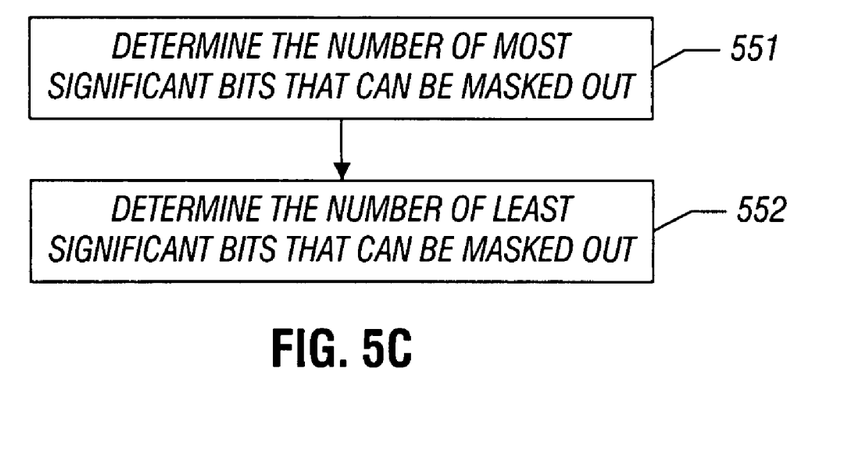
FIG. 5c shows a methodology for determining which M bits to use for SAD calculation purposes when video data values are naturally expressed as N values.

Thus generally, as depicted in FIG. 5c, the number of most significant bits that can be masked out are first determined 551; and then, the number of least significant bits that can be masked out are determined 552. In one embodiment, the offset is set to the minimum data value that exists in the reference macro block worth of data and the number of most significant bits that can be masked out is the rounded down integer of $$\log_2 |2^M/\text{MaxValue}|$$

where MaxValue is the maximum value observed in the reference block worth of data. For example, if M=8, N=5 and MaxValue=128, then the number of most significant bits that can be masked out is $\log_2|2^M/\text{MaxValue}|=\log_2|256/128|=\log_2|2|=1$ and the two least significant bits are masked out (i.e., X_ _ _ _ _XX). As another example, if M=8, N=5 and MaxValue=64, then the number of most significant bits that can be masked out is $\log_2|2^M/\text{MaxValue}|=\log_2|256/64|=\log_2|4|=2$ and the least significant bit is masked out (i.e., XX_ _ _ _ _X).

Figure 6:
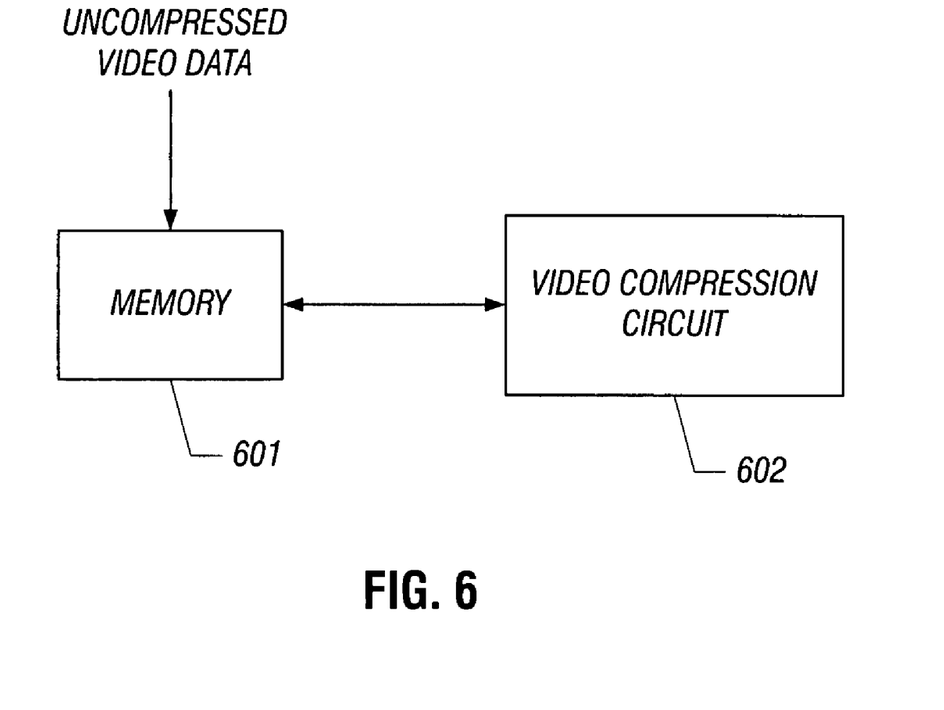
FIG. 6 shows a circuit that can be designed into a system that employs video compression.

FIG. 6 shows a generic design that can be used in any system that employs video compression including the SAD techniques discussed herein. According to the system design of FIG. 6, raw uncompressed video data is loaded into a memory 601. The memory 601, which can be an SRAM memory or DRAM memory, is coupled to a video compression circuit 602 (e.g., having an architecture that resembles the architecture observed in FIG. 3 where memory 60 is coupled to both register 302 and RAM 303). A reference macro block and its corresponding search window is loaded into the video compression circuit 602 from the memory 601. The video compression circuit contains AD units that process less than all of the bits per raw data value (e.g., as described from FIG. 4a through 5c) for the purpose of performing SAD calculations.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   determining a sum of absolute differences between pixel values from a reference block of a first frame and a corresponding values from a second frame in a search window;
   identifying a macroblock in the second frame with the lowest sum of absolute differences;
   using less than all the bits of the pixel values to determine the sum of absolute differences to reduce the size of circuitry needed to perform the sum of absolute differences determination;
   detecting that the data values from a reference block of a first frame are stuffed into an upper of two portions of a viewable dynamic range; and
   in response, adding an offset value to the data values of the reference block of the first frame and the data values from a second frame in a search window in order to center the data values within a viewable dynamic range.

2. The method of claim 1 including:
   taking an absolute difference between data values of macro blocks by masking a number of most significant bits of said data values; and
   calculating the number of most significant bits to mask.

3. The method of claim 1 wherein said offset is set equal to a minimum valued uncompressed video data value of said reference macro block.

4. The method of claim 2 wherein taking includes:
   a) taking the absolute difference of:
      1) less than all of the most significant bits of an uncompressed video data value from a reference macro block; and
      2) less than all of the most significant bits of an uncompressed video data value from a macro block worth of data within a search window;
   b) calculating a sum of absolute differences between corresponding data values within said reference macro block and said macro block worth of data, said absolute difference being one of said absolute differences; and
   c) calculating a motion vector based upon the position of said reference macro block in a first frame and the position of said macro block worth of data in said second frame, said sum of absolute differences being a lowest sum of absolute amongst other sums of absolute differences calculated between said reference macro block and other macro blocks worth of data within said search window.

5. The method of claim 4 wherein said first frame is a current frame and said second frame is previous frame.

6. The method of claim 4 further comprising loading said reference block's data values into a register prior to said taking.

7. The method of claim 6 further comprising loading said search window's data values into a random access memory prior to said taking the absolute difference.

8. The method of claim 4 further comprising determining which N bits from:
   1) said reference macro block's data value's M bits; and
   2) said search window macro block's data value's M hits are to be used for said taking the absolute difference.

9. The method of claim 8 wherein said determining comprises:
   determining the number of most significant hits that are to be masked from both said data values;
   determining the number of least significant bits that are to be masked from both said data values.

10. The method of claim 9 wherein said determining the number of least significant bits is (M–N)—(said determined number of most significant bits).

11. The method of claim 10 wherein said determining the number of most significant bits further comprises calculating $\log_2|2^M/\text{MaxValue}|$ were MaxValue is the maximum uncompressed video data value of said reference macro block.

12. An apparatus comprising:

logic circuitry to determine a sum of absolute differences between pixel values from a reference block of a first frame and a corresponding values from a second frame in a search window and to add an offset value to said reference macro block's uncompressed video data value and said search window macro block's uncompressed video data value;

a circuit to identify a macroblock in the second frame with the lowest sum of absolute differences;

said logic circuitry to use less than all the bits of the pixel values to determine the sum of absolute differences to reduce the size of the circuitry needed to perform the sum of absolute differences determination; and a device to detect that the data values from a reference block of a first frame are stuffed into an upper of two portions of a viewable dynamic range, and in response, add an offset value to the data values of the reference block of the first frame and the data values from a second frame in a search window in order to center the data values within a viewable dynamic range.

13. The apparatus of claim 12 further comprising:

logic circuitry to take an absolute difference between data values of macro blocks by masking a number of most significant bits of said data values; and a circuit to perform a calculation to determine the number of most significant bits to mask.

14. The apparatus of claim 13, including:

a) said logic circuitry to take an absolute difference between:
  1) less than all of the bits of an uncompressed video data value from a reference macro block;
  2) less than all of the bits of an uncompressed video data value from a macro block worth of data within a search window;

b) a circuit to calculate a number of most significant bits to mask;

c) a register to store said reference macro block, said register coupled to said logic circuitry; and d) a random access memory to store said search window, said random access memory coupled to said logic circuitry.

15. The apparatus of claim 14 further comprising additional logic circuitry to determine an offset to be added to:
  1) said reference macro block's uncompressed video data value; and
  2) said search window macro block's uncompressed video data value.

16. The apparatus of claim 15 further comprising a first adder having a first input to receive said reference macro block's uncompressed video data value and a second input coupled to said additional circuitry to receive said offset, said adder having an output that flows toward said logic circuitry.

17. The apparatus of claim 15 further comprising a second adder having a first input to receive said search window macro block's uncompressed video data value and a second input coupled to said additional circuitry to receive said offset, said adder having an output that flows toward said logic circuitry.

18. The apparatus of claim 14 wherein said logic circuitry is also to:

determine the number of most significant bits that are to be masked from both said data values; and determine the number of least significant bits that are to be masked from both said data values.

* * * * *

UNITED STATES PATENT AND TRADEMARK OFFICE
CERTIFICATE OF CORRECTION

PATENT NO. : 8,094,723 B2
APPLICATION NO. : 10/750075
DATED : January 10, 2012
INVENTOR(S) : Louis Lippincott et al.

It is certified that error appears in the above-identified patent and that said Letters Patent is hereby corrected as shown below:

Col. 8, line 53: "hits" should be --bits--.

Col. 8, line 57: "hits" should be --bits--.

Signed and Sealed this
Twenty-seventh Day of March, 2012

David J. Kappos
*Director of the United States Patent and Trademark Office*